United States Patent
Seki

(10) Patent No.: US 10,772,009 B2
(45) Date of Patent: Sep. 8, 2020

(54) WIRELESS COMMUNICATION SYSTEM

(71) Applicant: Panasonic Intellectual Property Management Co., Ltd., Osaka (JP)

(72) Inventor: Yuta Seki, Osaka (JP)

(73) Assignee: Panasonic Intellectual Property Management Co., Ltd., Osaka (JP)

(*) Notice: Subject to any disclaimer, the term of this patent is extended or adjusted under 35 U.S.C. 154(b) by 0 days.

(21) Appl. No.: 16/323,725

(22) PCT Filed: Dec. 19, 2016

(86) PCT No.: PCT/JP2016/005180
§ 371 (c)(1),
(2) Date: Feb. 6, 2019

(87) PCT Pub. No.: WO2018/078679
PCT Pub. Date: May 3, 2018

(65) Prior Publication Data
US 2019/0215728 A1    Jul. 11, 2019

(30) Foreign Application Priority Data
Oct. 26, 2016  (JP) .................. 2016-209974

(51) Int. Cl.
*H04W 28/08* (2009.01)
*H04W 88/08* (2009.01)
(Continued)

(52) U.S. Cl.
CPC ............. *H04W 28/08* (2013.01); *H04L 25/00* (2013.01); *H04W 88/085* (2013.01); *H04W 92/12* (2013.01)

(58) Field of Classification Search
CPC ..................................................... H04W 28/08
See application file for complete search history.

(56) References Cited

U.S. PATENT DOCUMENTS 6,282,425 B1  8/2001  Hottinen
9,924,375 B1 * 3/2018  Park .................. H04B 7/022
(Continued)

FOREIGN PATENT DOCUMENTS

JP    2007-258844 A    10/2007
JP    2007/282288 A    10/2007
(Continued)

OTHER PUBLICATIONS

Namba et al. "BBU-RRH switching schemes for centralized RAN", Published in: 7th International Conference on Communications and Networking in China; Date of Conference: Aug. 8-10, 2012; Date Added to IEEE Xplore: Jan. 24, 2013 (Year: 2013).*
(Continued)

*Primary Examiner* — Gary Mui
(74) *Attorney, Agent, or Firm* — Seed IP Law Group LLP

(57) ABSTRACT

A wireless communication system includes a plurality of baseband processing apparatuses each of which performs baseband signal processing and outputs a baseband signal, and a wireless apparatus which makes connections to the plurality of baseband processing apparatuses and transmits a radio frequency signal that is obtained by performing radio frequency signal processing on the baseband signal that is output from one of the plurality of baseband processing apparatuses.

13 Claims, 6 Drawing Sheets

(51) Int. Cl.
*H04L 25/00* (2006.01)
*H04W 92/12* (2009.01)

(56) References Cited

U.S. PATENT DOCUMENTS

| | | | |
|---|---|---|---|
| 2010/0113059 | A1 | 5/2010 | Morimoto et al. |
| 2013/0170353 | A1* | 7/2013 | Liu .................. H04W 28/0289 370/235 |
| 2015/0237571 | A1* | 8/2015 | Laraqui ................ H04W 24/10 370/332 |
| 2016/0029205 | A1* | 1/2016 | Sirotkin ................ H04W 24/02 455/418 |
| 2016/0270006 | A1* | 9/2016 | Choi ..................... H04W 16/32 |
| 2016/0316479 | A1* | 10/2016 | Choi ..................... H04L 5/0035 |
| 2017/0164215 | A1* | 6/2017 | Chen ..................... H04W 24/02 |
| 2017/0214624 | A1* | 7/2017 | Grob-Lipski ........... H04L 49/50 |
| 2017/0367039 | A1* | 12/2017 | Peng ..................... H04W 24/02 |
| 2018/0152937 | A1* | 5/2018 | Wen ...................... H04W 88/06 |

FOREIGN PATENT DOCUMENTS

| | | |
|---|---|---|
| JP | 2008-028561 A | 2/2008 |
| JP | 2012-039447 A | 2/2012 |
| JP | 2014-128024 A | 7/2014 |

OTHER PUBLICATIONS

International Search Report, dated Mar. 7, 2017, for the related International Patent Application No. PCT/JP2016/005180, 2 pages.
Shinobu Nanba et al., "BBU-RRH Switching Schemes for Centralized RAN", IEICE Technical Report, vol. 112, No. 424, RCS2012-250, pp. 73-78, The Institute of Electronics, Information and Communication Engineers (IEICE), Jan. 2013, 6 pages.

* cited by examiner

WIRELESS COMMUNICATION SYSTEM

This application is a U.S. national stage application of the PCT International Application No. PCT/JP2016/005180 filed on Dec. 19, 2016, which claims the benefit of foreign priority of Japanese patent application 2016-209974 filed on Oct. 26, 2016, the contents all of which are incorporated herein by reference.

TECHNICAL FIELD

The present disclosure relates to a wireless communication system.

BACKGROUND ART

In recent years, the introduction of an architecture called a Centralized Radio Access Network (C-RAN) is being studied in a wireless communication system in compliance with a cellular scheme.

In the C-RAN, a baseband unit (BBU) that performs processing on a baseband signal and a remote radio head (RRH) that performs conversion between a baseband signal and a radio frequency (HF) signal and transmission and reception of the radio frequency (RF) signal are physically separated from each other. The C-RAN employs a configuration such that one BBU positioned in a centralized control station and a plurality of RRHs arranged in a distributed manner are connected with an optical fiber cable or the like.

With this C-RAN configuration, an improvement in communication quality is possible by arranging the plurality of RRHs in a distributed manner so as to be at a short distance from a terminal. Because of this, extension of flexible coverage is possible. Furthermore, because one BBU can control the plurality of RRHs, cooperative operations among the plurality of RRHs can be performed easily. In the plurality of RRHs that make connections to the same BBU, a problem of interference can be controlled by performing the cooperative operation.

However, there is a limit on the number of RRHs that can make connections to one BBU. Furthermore, there is a problem that, because the cooperative operation is difficult between each of the RRHs that make connections to different BBUs, interference occurs due to a signal that is transmitted from an RRH different from the one the terminal is communicating with.

In order to address this problem, for example, NPL 1 discloses a technology in which the problem of the interference between each of the RRHs that make connections to different BBUs is solved by transmitting and receiving information for transmission control of the RRH between each of the BBUs.

CITATION LIST

Non-Patent Literature

NPL 1: IEICE technical report, vol. 112, no. 424, RCS2012-250, pp. 73-78, January 2013

SUMMARY OF THE INVENTION

However, in the technology in NPL 1, there is a problem that, because information for the transmission control of the RRH is transmitted and received between each of the different BBUs, the control of the RRH is complicated and an amount of information that are transmitted and received increases.

One non-limiting and exemplary embodiment provides, with a simple configuration, a wireless communication system that is capable of solving the problem of the interference between each of the RRHs.

According to an aspect of the present disclosure, a wireless communication system includes: a plurality of baseband processing apparatuses each of which performs baseband signal processing and outputs a baseband signal; and a wireless apparatus which transmits a radio frequency signal that is obtained by making connections to the plurality of baseband processing apparatuses and performing radio frequency signal processing on the baseband signal that is output from one of the plurality of baseband processing apparatuses.

These comprehensive or specific aspects may be realized by a system, an integrated circuit, a computer program, or a recording medium, and may be realized by an arbitrary combination of a system, an apparatus, a method, an integrated circuit, a computer program, and a recording medium.

According to the aspect of the present disclosure, the interference between each of the RRHs can be suppressed with a simple configuration.

A further advantage and effect according to the aspect of the present disclosure is apparent from the specification and the drawings. The advantage and/or effect are provided by several embodiments and features that are described and illustrated in the specification and the drawings, respectively, but all of these do not necessarily need to be provided in order to obtain one or more features that are the same.

DESCRIPTION OF EMBODIMENTS (Circumstance that Leads to Present Disclosure)
First, a circumstance that leads to the present disclosure is described. The present disclosure relates to a wireless communication system that has a C-RAN configuration in which a baseband unit (BBU) that performs processing on a baseband signal and a remote radio head (RRH) that performs conversion between a baseband signal and a radio frequency (RF) signal and transmission and reception of the radio frequency (RF) signal are physically separated from each other.

Figure 1:
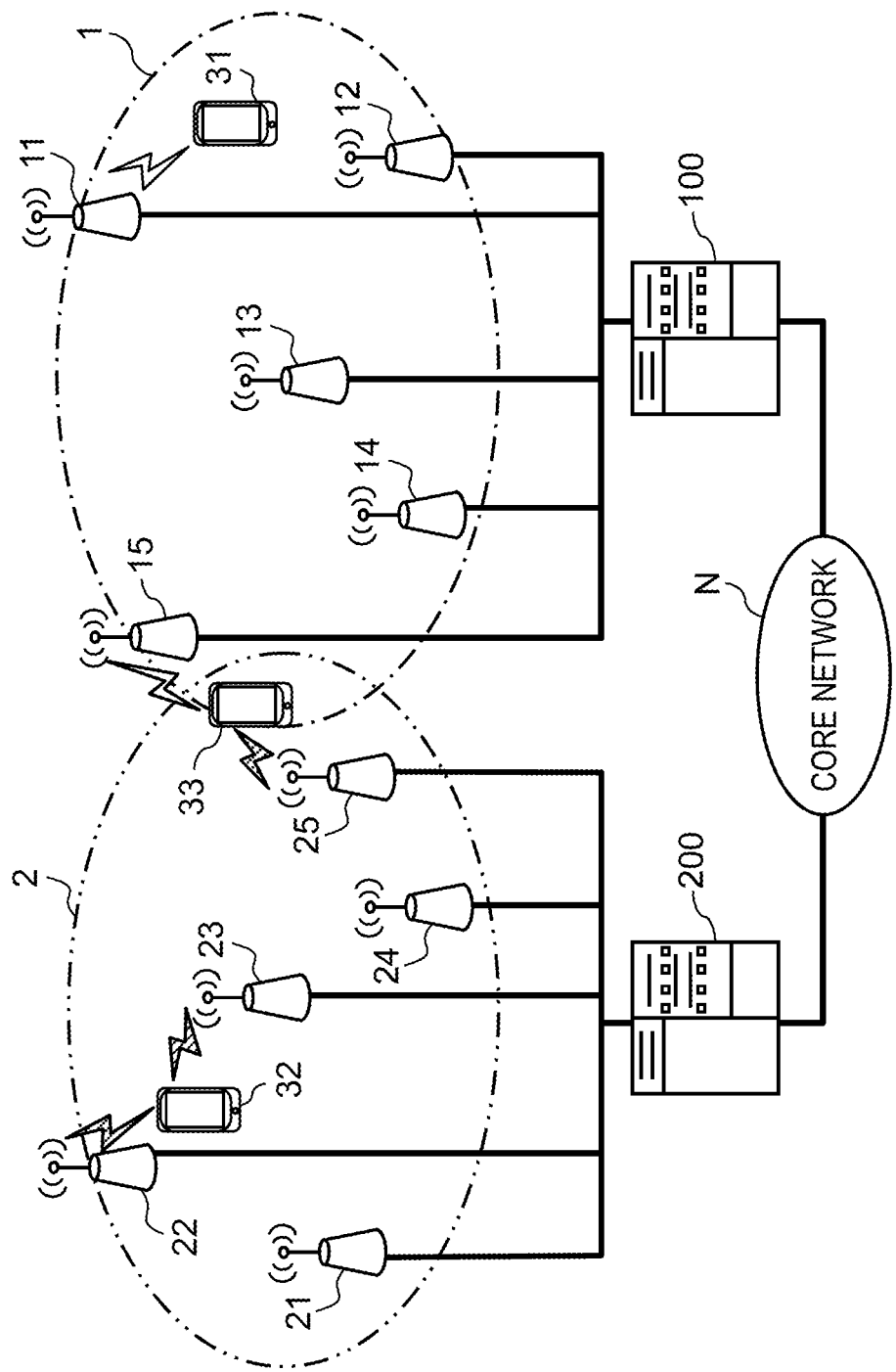
FIG. 1 is a diagram illustrating an example of a wireless communication system having a C-RAN configuration in the related art.

FIG. 1 is a diagram illustrating an example of the wireless communication system having a C-RAN configuration in the related art.

FIG. 1 illustrates BBU 100 and BBU 200 connected to a core network in a wired manner. FIG. 1 further illustrates RRH 11 to RRH 15 connected to BBU 100 with an optical fiber cable and RRH 21 to RRH 25 connected to BBU 200 with an optical fiber cable. RRH 11 to RRH 15, and RRH 21 to RRH 25 are arranged in a distributed manner, and make wireless connections to terminals (for example, terminal 31 to terminal 33) that are within their respective communication areas. RRH 11 to RRH 15 form cell 1, and RRH 21 to RRH 25 form cell 2.

The cell in the present disclosure refers to a communication area that is formed by one BBU and more particularly to a communication area that includes a communication area of each RRH which makes a connection to one BBU.

Although not illustrated, BBU 100 and BBU 200 may be connected with each other with a direct interface (for example, an X2 interface).

Terminal 31 makes a wireless connection to RRH 11, and receives a signal that is transmitted from RRH 11. In FIG. 1, terminal 31 is outside the communication area of other RRHs, and thus, is not influenced by a signal that is transmitted from other RRHs.

In FIG. 1, terminal 32 is within communication areas of RRH 22 and RRH 23, makes a wireless connection to RRH 22, and receives a signal transmitted from RRH 22. RRH 22 and RRH 23 make connections to the same BBU 200 and perform a cooperative operation under the control of BBU 200. Thus, when receiving a signal from RRH 22, terminal 32 is not interfered with the signal transmitted from RRH 23. For example, by BBU 200, transmission from RRH 22 and RRH 23 can be performed using a time-division scheme so that, when terminal 32 receives a signal from RRH 22, RRH 23 does not transmit a signal.

In FIG. 1, terminal 33 is within communication areas of RRH 15 that is positioned at an edge of cell 1, and of RRH 25 that is positioned at an edge of cell 2 which is adjacent to the edge of cell 1, makes a wireless connection to RRH 15, and receives a signal that is transmitted from RRH 15. In this case, because RRH 15 and RRH 25 make connections to different BBUs (more precisely, BBU 100 and BBU 200), the cooperative operation is difficult. Thus, when RRH 15 and RRH 25 transmits signals in the same frequency band at the same time, terminal 33 receiving a signal transmitted from RRH 15 is interfered with a signal transmitted from RRH 25.

More precisely, with the C-RAN configuration as illustrated in FIG. 1, RRHs that make connections to different respectively, transmit signals in the same frequency, at short distance and at the same time, and thus a terminal receiving a signal transmitted from one RRH is interfered with a signal transmitted from the other RRH.

The present inventors hit on the idea that a problem of interference between RRHs could be solved by employing a configuration in which a signal is output from each of the plurality of BBUs to one RRH and the RRH selects and transmits one of the signals, leading to the present disclosure.

Embodiments of the present disclosure will be described in detail below with reference to the drawings. Embodiments that will be described below are examples, and the present disclosure is not limited to the following embodiments.

First Exemplary Embodiment

Figure 2:
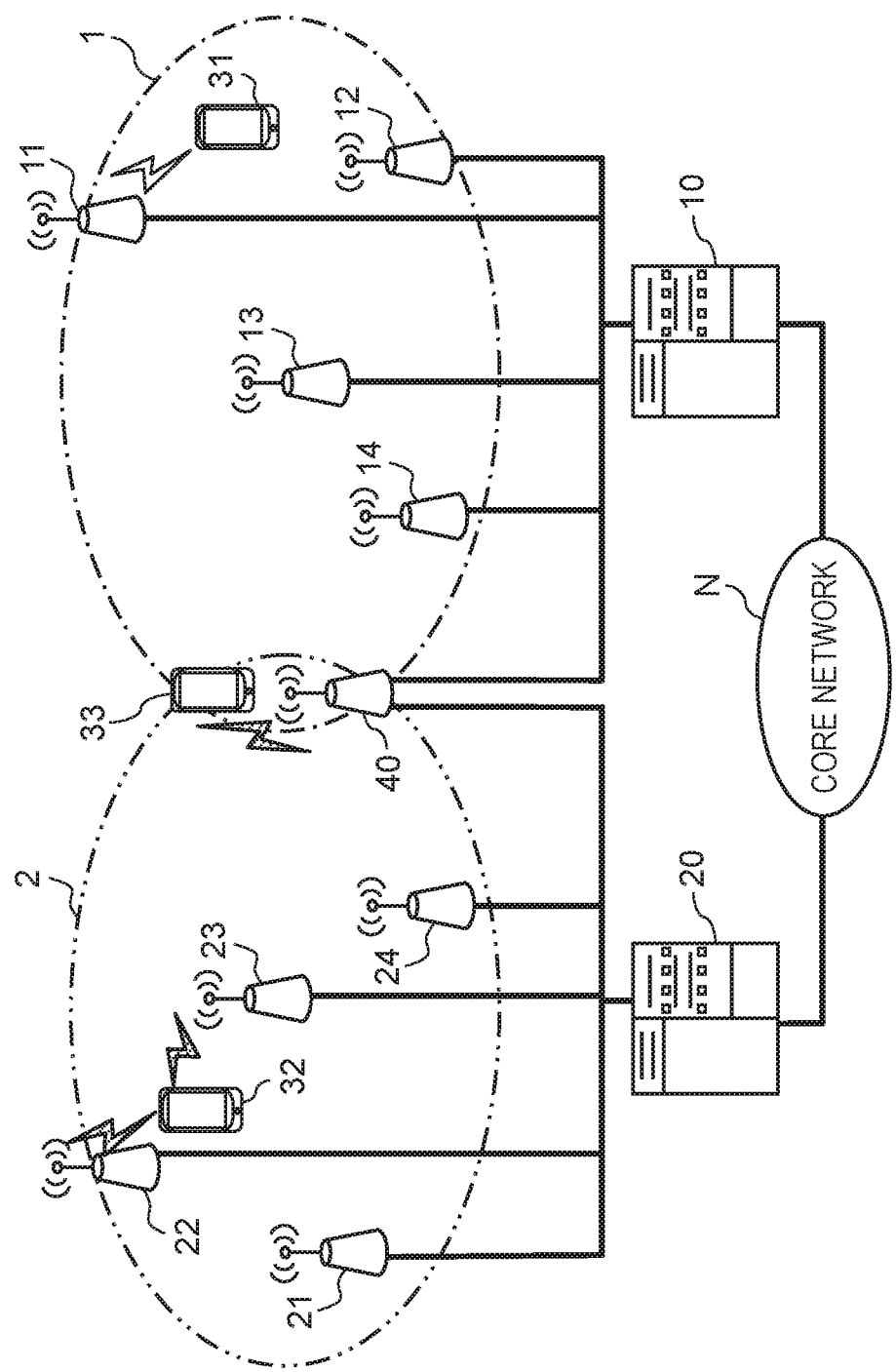
FIG. 2 is a diagram illustrating an example of an entire configuration of a wireless communication system according to a first exemplary embodiment of the present disclosure.

FIG. 2 is a diagram illustrating an example of an entire configuration of a wireless communication system according to the present first exemplary embodiment. In FIG. 2, the same constituent as in FIG. 1 in terms of the configuration is given the same reference numeral and a description thereof is omitted.

In FIG. 2, instead of RRH 15 that is positioned at the edge of cell 1 in FIG. 1 and RRH 25 that is positioned at the edge of cell 2, RRH 40 is positioned. More precisely, RRH 40 is installed at an edge of a cell. Furthermore, in FIG. 2, BBU 100 and BBU 200 in FIG. 1 are replaced with BBU 10 and BBU 20, respectively. RRH 40 make connections to BBU 10 and BBU 20 via an optical fiber cable. More precisely, RRH 40 is a multi-access RRH that is accessible from BBU 10 and BBU 20.

Although not illustrated, BBU 10 and BBU 20 may be connected with each other with a direct interface (for example, the X2 interface).

With this configuration, RRH 40 transmits a baseband signal that is output from any one BBU of BBU 10 and BBU 20.

Specifically, configurations of BBU 10, BBU 20, and RRH 40 are described with reference to FIG. 3.

Figure 3:
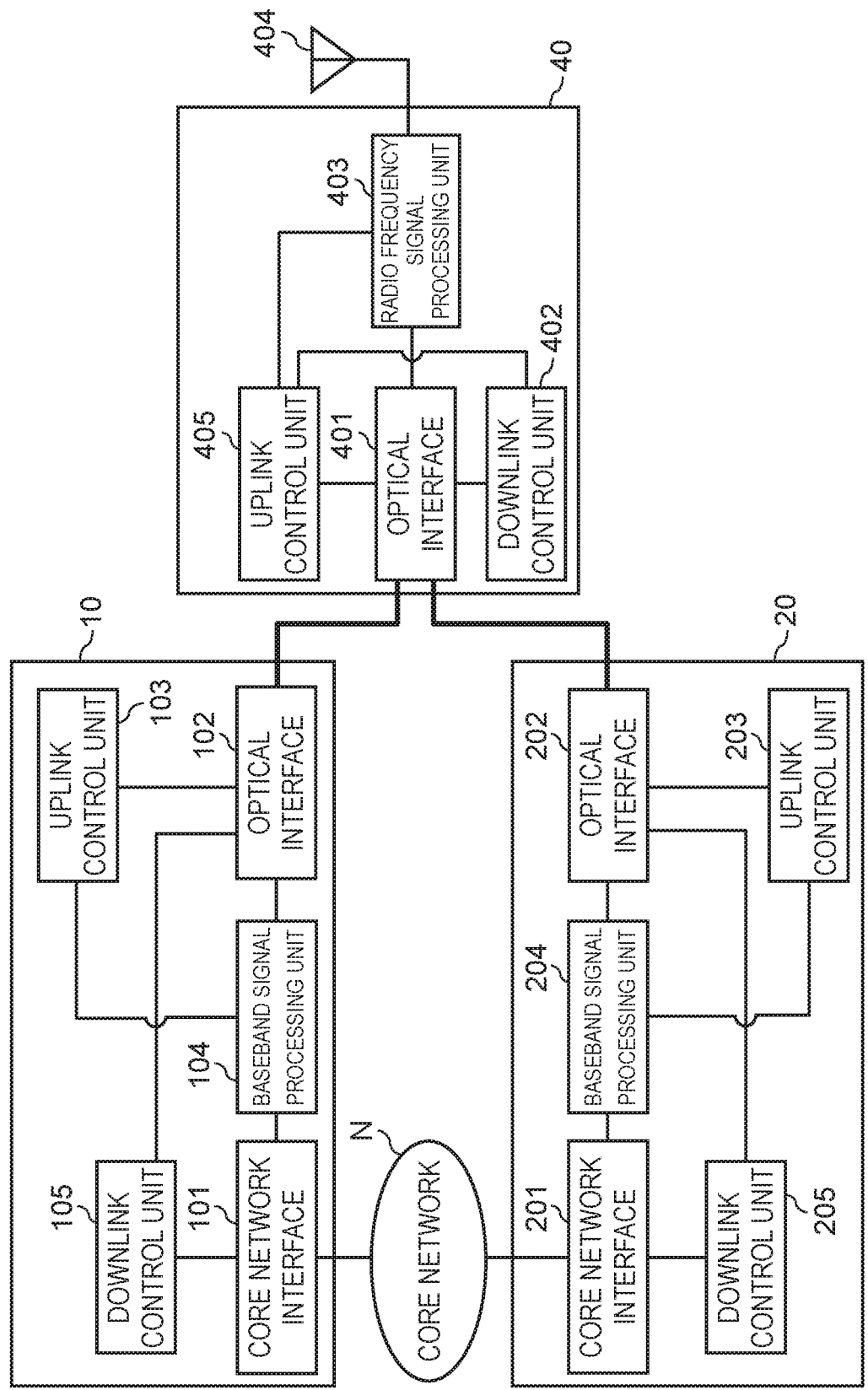
FIG. 3 is a diagram illustrating examples of configurations of principal constituents of the wireless communication system according to the first exemplary embodiment of the present disclosure.

FIG. 3 is a diagram illustrating examples of configurations of principal constituents of the wireless communication system according to the present first exemplary embodiment.

BBU 10 includes core network interface 101, optical interface 102, uplink control unit 103, baseband signal processing unit 104, and downlink control unit 105. BBU 20 includes core network interface 201, optical interface 202, uplink control unit 203, baseband signal processing unit 204, and downlink control unit 205. BBU 10 and BBU 20 have the same configuration. Thus, a configuration of BBU 10 will be described below and a description of BBU 20 will be omitted.

Core network interface 101 is an interface for a communication between the core network N and BBU 10.

Optical interface 102 is an interface for a communication between for BBU 10 and RRH 40. Optical interface 102 performs conversion processing or the like between an electrical signal that is processed within BBU 10 and an optical signal that is transferred with an optical fiber cable.

Optical interface 102 is an interface for a communication between each of RRHs for example, RRH 11 to RRH 14 in FIG. 2) other than BBU 10 and RRH 40.

Uplink control unit 103 performs processing for establishing an uplink from RRH 40 to BBU 10. Downlink control unit 105 performs processing for establishing a downlink from BBU 10 to RRH 40. Processing for link establishment will be in detail below.

Baseband signal processing unit 104 performs baseband signal processing, such as demodulation processing and decoding processing, on a baseband signal that is acquired from RRH 40 via optical interface 102, and generates data such as user data. Baseband signal processing unit 104 transmits the generated data to a destination on the core network N via core network interface 101.

Furthermore, baseband signal processing unit 104 performs the baseband signal processing, such as coding processing and modulation processing, on user data or the like that is acquired from the core network N via core network interface 101, and generates a baseband signal. Baseband signal processing unit 104 outputs the baseband signal to RRH 40 via optical interface 102.

RRH 40 includes optical interface 401, downlink control unit 402, radio frequency signal processing unit 403, antenna 404, and uplink control unit 405.

Optical interface 401 is an interface between communications between BBU 10 and RRH 40, and between BBU 20 and RRH 40. Optical interface 401 performs the conversion processing or the like between an electrical signal that is processed within RRH 40 and an optical signal that is transferred with an optical fiber cable.

Downlink control unit 402 performs the processing for establishing the downlink from BBU 10 to RRH 40. Furthermore, uplink control unit 405 performs the processing for establishing the uplink from RRH 40 to BBU 10. Processing for link establishment will be in detail below.

Radio frequency signal processing unit 403 performs radio frequency signal processing, such as D/A conversion processing, power amplification processing, and frequency conversion processing, on a baseband signal that is acquired from BBU 10 or BBU 20 via optical interface 401, and generates a radio frequency signal. Radio frequency signal processing unit 403 transmits the generated radio frequency signal via antenna 404.

Furthermore, radio frequency signal processing unit 403 performs the radio frequency signal processing, such as the frequency conversion processing, the power amplification, and the A/D conversion processing, on the radio frequency signal that is received from a terminal via antenna 404, and generates a baseband signal. Radio frequency signal processing unit 403 outputs the baseband signal to BBU that corresponds to a destination that is included in the generated baseband signal.

Processing for link establishment between each of BBU 10 and BBU 20, and RRH 40 is described.

First, in a case where user data is acquired via core network interface 101, downlink control unit 105 of BBU 10 determines that there is a baseband signal which has to be output to RRH 40 and outputs a control signal, which includes information (synchronization control information or a synchronization request) that requests the link establishment, to RRH 40. In the same manner, in a case where user data is acquired via core network interface 201, downlink control unit 205 of BBU 20 determines that there is a baseband signal which has to be transmitted to RRH 40 and outputs a control signal, which requests the link establishment, to RRH 40.

Downlink control unit 402 of RRH 40 acquires the control signal via optical interface 401. Based on the control signal, downlink control unit 402 establishes the downlink and determines the BBU that outputs the baseband signal.

Specifically, based on a given algorithm, downlink control unit 402 performs link establishment processing on a request for the link establishment, which is included in the control signal. As a result, downlink control unit 402 determines that a BBU which establishes the downlink earlier, as a BBU that outputs the baseband signal. For example, in a case where the wireless communication system that is illustrated in each of FIGS. 2 and 3, complies with Common Public Radio Interface (CPRI), downlink control unit 402 determines a BBU that establishes L1 Synchronization in the CPRI earlier, as the BBU that outputs the baseband signal.

Downlink control unit 402 notifies uplink control unit 405 of information of the BBU that establishes the downlink earlier. Uplink control unit 405 outputs a control signal that includes information (the synchronization control information or a synchronization response) which requests the uplink, to the BBU that establishes the downlink earlier.

In a case where the BBU that establishes the downlink earlier is BBU 10, uplink control unit 103 acquires the control signal from RRH 40 via optical interface 102. In this case, uplink control unit 103 establishes the uplink to RRH 40.

After the link between (the uplink or the downlink) BBU 10 and RRH 40 is established, baseband signal processing unit 104 of BBU 10 acquires information on the link establishment from uplink control unit 103. Furthermore, radio frequency signal processing unit 403 of RRH 40 acquires the information on the link establishment from uplink control unit 405. Then, transmission and reception of the baseband signal between baseband signal processing unit 104 and radio frequency signal processing unit 403 are performed.

In a case where the BBU that establishes the downlink earlier is BBU 10, because the control signal is not acquired from RRH 40, uplink control unit 203 of BBU 20 does not establish the uplink to the RRH 40.

On the other hand, in a case where the BBU that establishes the downlink earlier is BBU 20, uplink control unit 203 acquire the control signal from RRH 40 via optical interface 202. In this case, uplink control unit 203 establishes the uplink to RRH 40.

After the link (the uplink or the downlink) is established between BBU 20 and RRH 40, baseband signal processing unit 204 of BBU 20 acquires the information on the link establishment from uplink control unit 203. Furthermore, radio frequency signal processing unit 403 of RRH 40 acquires the information on the link establishment from uplink control unit 405. Then, the transmission and reception of the baseband signal between baseband signal processing unit 204 and radio frequency signal processing unit 403 are performed.

In a case where the BBU that establishes the downlink earlier is BBU 20, because the control signal is not acquired from RRH 40, uplink control unit 103 of BBU 10 does not establish the uplink to the RRH 40.

As described above, the wireless communication system according to the present first exemplary embodiment includes BBU 10 and BBU 20 (a plurality of baseband processing apparatuses) that perform the baseband signal processing and output the baseband signal, and RRH 40 (a wireless apparatus) that makes connections to BBU 10 and BBU 20, and transmits the radio frequency signal that is obtained by performing the radio frequency signal processing on the baseband signal that is output from one of BBU 10 and BBU 20.

With this configuration, even in a case where different BBUs output baseband signals, RRH 40 performs the radio frequency signal processing of any one baseband signal and transmits the radio frequency signal. Because of this, a problem of interference within a communication area of RRH 40 can be solved. As a result, throughput of the entire wireless communication system can be improved.

Furthermore, in the present first exemplary embodiment, RRH 40 is installed in one cell that is formed by BBU 10 and/or at an edge of one cell that is formed by BBU 20.

With this configuration, a problem of interference between each of the cells can be solved. Furthermore, because RRH that is installed at location other than an edge of a cell does not need to be connected to a plurality of BBUs, the cost for the entire wireless communication system can be reduced.

Furthermore, in the present first exemplary embodiment, RRH 40 performs the radio frequency signal processing on the baseband signal that is output from the BBU which establishes the link earlier, of BBU 10 and BBU 20.

With this configuration, without changing a configuration of the BBU, the problem of the interference within the communication area of RRH 40 can be solved and the throughput of the entire wireless communication system can be improved.

Second Exemplary Embodiment

In the first exemplary embodiment, the example is described in which the BBU that establishes the link earlier, of BBU 10 and BBU 20 that make connections to RRH 40 outputs the baseband signal to RRH 40. In the present second exemplary embodiment, an example is described in which, based on a priority that is stipulated in advance, BBU 10 and BBU 20 that make connections to RRH 40 output the baseband signal to RRH 40.

An entire configuration a wireless communication system according to the present second exemplary embodiment is the same as in FIG. 2, and thus a detailed description thereof is omitted. Configuration of principal constituents of the wireless communication system according to the present second exemplary embodiment is described with reference to FIG. 4.

Figure 4:
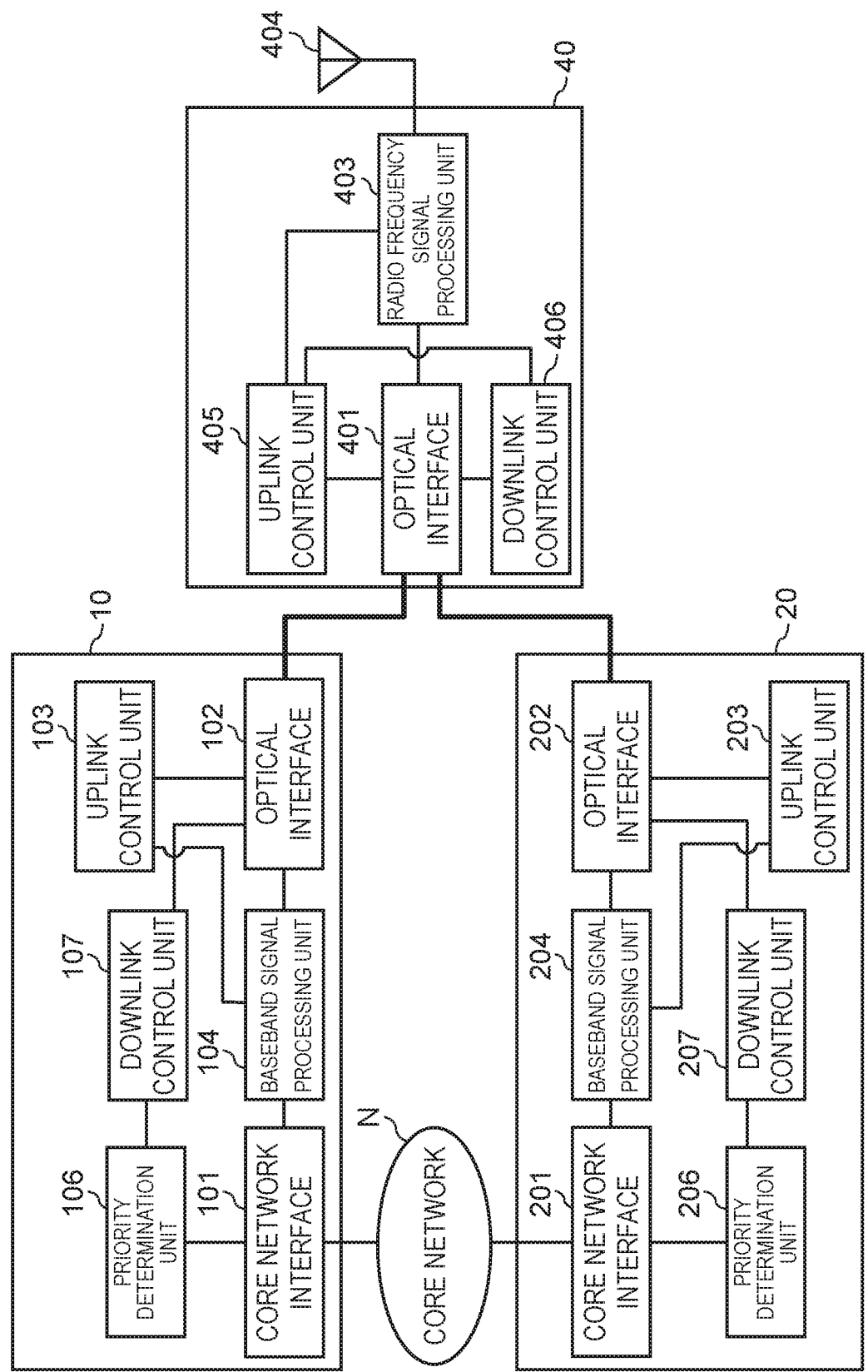
FIG. 4 is a diagram illustrating examples of configurations of principal constituents of a wireless communication system according to a second exemplary embodiment of the disclosure embodiment.

FIG. 4 is a diagram illustrating examples of the configurations of the principal constituents of the wireless communication system according to the present second exemplary embodiment. In FIG. 4, the same constituent as FIG. 3 in terms of the configuration is given the same reference numeral and a description thereof is omitted.

BBU 10 in FIG. 4 has a configuration in which priority determination unit 106 is added to BBU 10 in FIG. 3 and in which downlink control unit 105 is replaced with downlink control unit 107. Furthermore, BBU 20 in FIG. 4 has a configuration in which priority determination unit 206 is added to BBU 20 in FIG. 3 and in which downlink control unit 205 is replaced with downlink control unit 207.

Priority determination unit 106 stores a priority that is prescribed in advance for every time slot. With this priority, a BBU that can output the baseband signal preferentially for every time slot, of BBU 10 and BBU 20 that make connections to RRH 40 is prescribed. Based on the priority, priority determination unit 106 instructs downlink control unit 107 to generate a control signal that includes a signal which requests the downlink establishment.

In the same manner as priority determination unit 106, priority determination unit 206 stores the priority that is prescribed in advance for every time slot. Based on the priority, priority determination unit 206 instructs downlink control unit 207 to generate the control signal that includes the signal which requests the downlink establishment.

For example, it is assumed that in an odd-numbered time slot, a priority of BBU 10 is prescribed as to be higher than a priority of BBU 20 and that in an even-numbered time slot, the priority of BBU 20 is prescribed as to be higher than the priority of BBU 10.

In this case, in the odd-numbered time slot, the priority of BBU 10 is high. Because of this, priority determination unit 106 instructs downlink control unit 107 to generate a control signal. Downlink control unit 107 generates the control signal and outputs the generated control signal to RRH 40 via optical interface 102. On the other hand, in the odd-numbered time slot, the priority of BBU 20 is low. Because of this, priority determination unit 206 does not instruct downlink control unit 207 to generate the control signal.

In the same manner, in the even-numbered time slot, the priority of BBU 20 is high. Because of this, priority determination unit 206 instructs downlink control unit 207 to generate the control signal. Downlink control unit 207 generates the control signal and outputs the control signal to RRH 40 via optical interface 202. On the other hand, in the even-numbered time slot, the priority of BBU 10 is low. Because of this, priority determination unit 106 does not instruct downlink control unit 107 to generate the control signal.

However, in a case where a BBU that has a high priority does not input the baseband signal to RRH 40, a BBU that is prescribed as to have a next high priority may output the baseband signal to RRH 40.

For example, in the even-numbered time slot, in a case where BBU 20 has a higher priority than BBU 10 does not output the baseband signal to RRH 40, priority determination unit 106 of BBU 10 may instruct downlink control unit 107 to generate the control signal.

In this case, priority determination unit 106 acquires information relating to whether or not BBU 20 outputs the baseband signal to RRH 40, via core network interface 101, via an interface or the like for a direct connection, such as the X2 interface, that is not illustrated. In the same manner, priority determination unit 206 acquires information relating to whether or not BBU 10 outputs the baseband signal to RRH 40, via core network interface 201, the interface for the direction connection, such as the X2 interface, that is not illustrated, or the like.

More precisely in BBU 10 and BBU 20, based on a priority for every time slot, priority determination unit 106 and priority determination unit 206 determine whether or not to provide an instruction to generate the control signal, in such a manner that any one of downlink control unit 107 and downlink control unit 207 generates the control signal.

RRH 40 in FIG. 4 has a configuration in which downlink control unit 402 of RRH 40 in FIG. 3 is replaced with downlink control unit 406.

Downlink control unit 406 acquires a control signal from BBU 10 or BBU 20. Based on a given algorithm, downlink control unit 406 performs the link establishment processing on the request for the link establishment, which is included in the control signal.

In the present second exemplary embodiment, downlink control unit 406 acquires the control signal from any one of BBU 10 and BBU 20 in each time slot. Downlink control unit 406 notifies uplink control unit 405 of the information of BBU that establishes the downlink. Uplink control unit 405 outputs the control signal that includes the information (the synchronization control information or the synchronization response) which requests the uplink, to the BBU that establishes the downlink.

The uplink control unit (uplink control unit 103 or uplink control unit 203) of the BBU that establishes the downlink acquires the control signal from RRH 40 and establishes the uplink to RRH 40.

The baseband signal processing unit of the BBU that establishes the link (the uplink or the downlink) to RRH 40 performs the transmission and reception of the baseband signal between radio frequency signal processing unit 403 of RRH 40.

As described above, in the present second exemplary embodiment, priorities are prescribed in advance for BBU 10 and BBU 20 for every time slot (every given time interval), and the BBU that has the highest priority, of BBU 10 and BBU 20 outputs the baseband signal to RRH 40.

With this configuration, even in the case where different BBUs output baseband signals, RRH 40 performs the radio frequency signal processing of any one baseband signal and transmits the radio frequency signal. Because of this, the problem of the interference within the communication area of RRH 40 can be avoided. As a result, the throughput of the entire wireless communication system can be improved.

Furthermore, with this configuration, RRH 40 can avoid acquiring control signals from a plurality of BBUs, and because of this, can reduce processing load on RRH 40.

Furthermore, in the present second exemplary embodiment, in a case where the BBU for which the highest priority is prescribed does not output the baseband signal, the BBU for which the next highest priority is prescribed outputs the baseband signal.

With this configuration, in a time slot in which the BBU for which the highest priority is prescribed, a situation where the RRH does not transmit a signal can be avoided, and a decrease in the throughput of the entire wireless communication system can be suppressed.

A time slot according to the present second exemplary embodiment is an arbitrary time. For example, one time slot is one subframe or one radio frame. Alternatively, a plurality of subframes or a plurality of radio frames may be collectively one time slot.

Furthermore, the priority for every timing slot, which is prescribed for each of BBU 10 and BBU 20 that are described in the present second exemplary embodiment is only one example, and the present disclosure is not limited this. For example, in a plurality of contiguous time slots, the same priority may be prescribed.

Modification Example of the Second Exemplary Embodiment

In the present second exemplary embodiment, the example is described in which BBU 10 and BBU 20 includes priority determination unit 106 and priority determination unit 206, respectively. In a modification example of the present second exemplary embodiment, instead of BBU 10 and BBU 20 including the priority determination unit, an example is described in which RRH 40 includes the priority determination unit.

Figure 5:
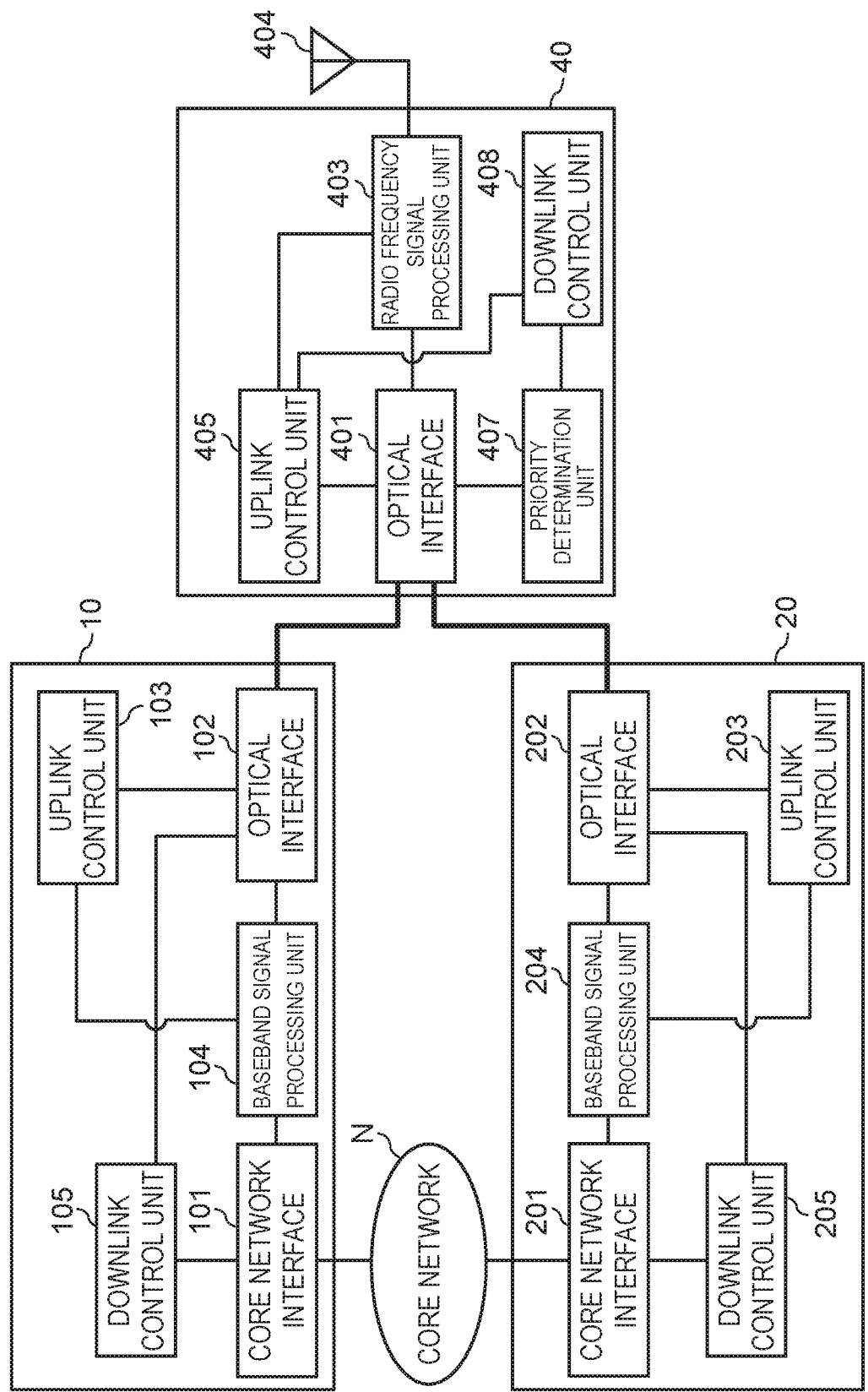
FIG. 5 is a diagram illustrating examples of configurations of principal constituents of a wireless communication system according to a modification example of the second exemplary embodiment of the disclosure embodiment.

FIG. 5 is a diagram illustrating examples of configurations of principal constituents of a wireless communication system according to a modification example of the present second exemplary embodiment. In FIG. 5, the same constituent as in FIG. 3 in terms of the configuration is given the same reference numeral and a description thereof is omitted.

BBU 10 and BBU 20 in FIG. 5 have the same configurations as BBU 10 and BBU 20, respectively, in FIG. 3. RRH 40 in FIG. 5 has a configuration in which a priority determination unit 407 is added to RRH 40 in FIG. 3 and in which downlink control unit 402 is replaced with downlink control unit 408.

Priority determination unit 407 stores a priory that is prescribed in advance every given time. With this priority, a BBU that can establish the link to the MI preferentially every given time between BBU 10 and BBU 20. In a case where the control signal is acquired from each of BBU 10 and BBU 20 with a given duration, based on the priority, priority determination unit 407 determines the BBU that establishes the downlink. Priority determination unit 407 selects the control signal that is acquired from the BBU which establishes the downlink, and outputs the selected control signal to downlink control unit 408.

Based on a given algorithm, downlink control unit 408 performs the link establishment processing on the request for the link establishment, which is included in the control signal that is acquired from priority determination unit 407. Downlink control unit 408 notifies uplink control unit 405 of the information of the BBU that establishes the downlink.

In the modification example that is illustrated in FIG. 5, in a case where the baseband signal is present which has to be transmitted to RRH 40, each of BBU 10 and BBU 20 outputs the control signal, which includes the information (the synchronization control information or the synchronization request) that requests the link establishment, to RRH 40. RRH 40 performs the establishment of the link (the downlink or the uplink) to a BBU that has a high priority, of BBUs that are destinations of the control signal which are acquired for a give duration.

With this modification example, even in the case where different BBUs output baseband signals, RRH 40 performs the radio frequency signal processing of any one baseband signal and transmits the radio frequency signal. Because of this, the problem of the interference within the communication area of RRH 40 can be avoided. As a result, the throughput of the entire wireless communication system can be improved.

Third Exemplary Embodiment

In the second exemplary embodiment, the example is described in which the priority of the BBU is prescribed in advance for every time slot. In the third exemplary embodiment, an example is described in which a priority is determined by a load situation of each BBU.

Figure 6:
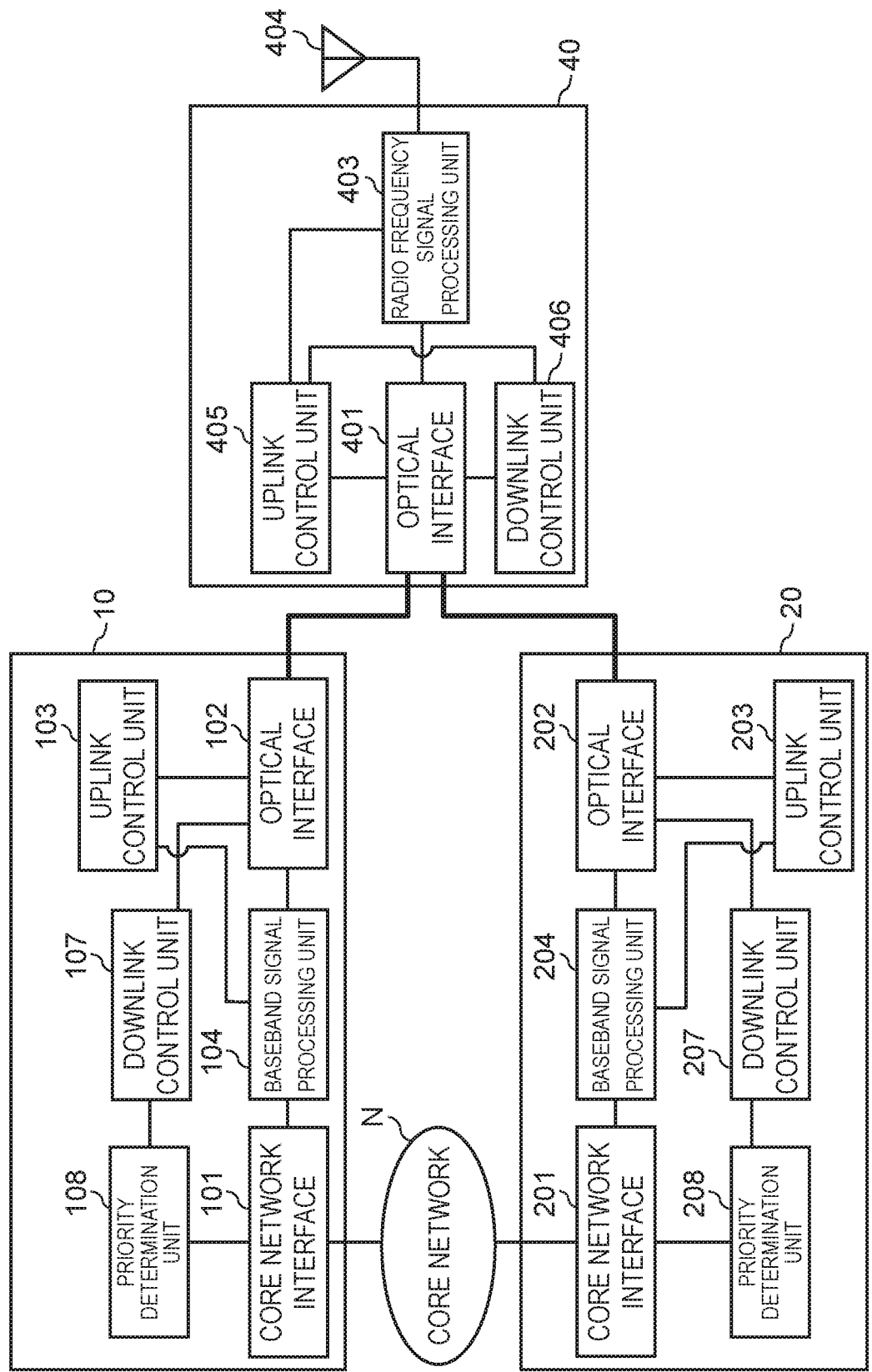
FIG. 6 is a diagram illustrating examples of configurations of principal constituents of a wireless communication system according to a third exemplary embodiment of the present disclosure.

FIG. 6 is a diagram illustrating configurations of principal constituents of a wireless communication system according to the present third exemplary embodiment. In FIG. 6, the same constituent as in FIG. 4 in terms of the configuration is given the same reference numeral and a description thereof is omitted.

BBU 10 in FIG. 6 has a configuration in which priority determination unit 106 of BBU 10 in FIG. 4 is replaced with priority determination unit 108. Furthermore, BBU 20 in FIG. 6 has a configuration in which priority determination unit 206 of BBU 20 in FIG. 4 is replaced with priority determination unit 208.

Each of priority determination unit 108 and priority determination unit 208 acquires information relating to a load on BBU 10 and information relating to a load on BBU 20. Information relating to the load, for example, is a message (LOAD INFORMATION) or the like at the time of notification of load information, which is communicated via the X2 interface between each of the BBUs, in a Self Organization Network (SON) function of autonomously performing optimization of a radio parameter or a network setting.

In a case where, as a result of comparing loads on BBUs, the load on BBU 10 is heavier than the load on BBU 20, priority determination unit 108 instructs downlink control unit 107 to generate a control signal that includes a signal which requests the downlink establishment. On the other hand, in a case where the load on BBU 20 is heavier than the load on BBU 10, priority determination unit 108 does not instruct downlink control unit 107 to generate the control signal that includes the signal which requests the link establishment between BBU 10 and RRH 40.

In the same manner, in the case where, as a result of comparing loads on BBUs, the load on BBU 20 is heavier than the load on BBU 10, priority determination unit 208 instructs downlink control unit 207 to generate the control signal that includes the signal which requests the downlink establishment. On the other hand, in the case where the load on BBU 10 is heavier than the load on BBU 20, priority determination unit 208 does not instruct downlink control unit 108 to generate the control signal that includes the signal which requests the link establishment between BBU 10 and RRH 40.

However, in a case where a BBU, a load on which is heaviest, does not output the baseband signal to RRH 40, a BBU, a load on which is next heaviest, may output the baseband signal to RRH 40.

In this case, priority determination unit 108 acquires the information relating to whether or not BBU 20 outputs the baseband signal to RRH 40, via core network interface 101, via the interface or the like for the direct connection, such as the X2 interface, that is not illustrated. In the same manner, priority determination unit 208 acquires information relating to whether or not BBU 10 outputs the baseband signal to RRH 40, via core network interface 201, the interface for the direction connection, such as the X2 interface, that is not illustrated, or the like.

More precisely, in BBU 10 and BBU 20, based on a priority for each BBU, priority determination unit 108 and priority determination unit 208 determine whether or not to provide the instruction to generate the control signal, in such a manner that any one of downlink control unit 107 and downlink control unit 207 generates the control signal.

As a result, downlink control unit 406 of RRH 40 acquires the control signal from any one of BBU 10 and BBU 20. Downlink control unit 406 notifies uplink control unit 405 of the information of the BBU that establishes the downlink. Uplink control unit 405 outputs the control signal that includes the information (the synchronization control information or the synchronization response) which requests the uplink, to the BBU that establishes the downlink.

The uplink control unit (uplink control unit 103 or uplink control unit 203) of the BBU that establishes the downlink acquires the control signal from RRH 40 and establishes the uplink to RRH 40.

The baseband signal processing unit of the BBU that establishes the link (the uplink or the downlink) to RRH 40 performs the transmission and reception of the baseband signal between radio frequency signal processing unit 403 of RRH 40.

As described above, in the present third exemplary embodiment, BBU 10 and BBU 20 acquire pieces of information relating to the loads on each other, and the BBU, the load on which is heaviest, of BBU 10 and BBU 20, outputs the baseband signal.

With this configuration, because the BBU, the load on which is heavier, can output the baseband signal preferentially, the load on the BBU, the load on which is heavier, can be reduced, and the loads on the BBUs can be equalized.

Furthermore, in the present third exemplary embodiment, in a case where the BBU, the load on which is heavier, does not output the baseband signal, the BBU, the load on which is next heavier outputs the baseband signal.

With this configuration, in a time slot in which the BBU, the load on which is heaviest is preferred, the situation where the RRH does not transmit a signal can be avoided, and the decrease in the throughput of the entire wireless communication system can be suppressed.

In each of the embodiments described above, the example in which two BBUs make connections to an RRH are described, but the present disclosure is not limited to this. Three or more BBUs may make connections to an RRH.

In each of the embodiments described above, a RRH to which a plurality of BBUs make connections is positioned at an edge of a cell is described, but the present disclosure is not limited to this. The RRH to which the plurality of BBUs may be positioned at other than the edge of the cell. Even in this case, the problem of the interference between each of the RRHs can be solved.

Furthermore, in each of the embodiments described above, the example is described in which the optical fiber cable connects between the RRH and the BBU, but the present disclosure is not limited to this. A coaxial cable, a metal cable, or the like may connect between the RRH and the BBU.

The various embodiments are described above with reference to the drawings, but it goes without saying that the present disclosure is not limited to such examples. It is apparent to a person of ordinary skill that various modification examples or revision examples can be contemplated within the claim scope, and it is understood that these also justifiably fall within the technical scope of the present disclosure. Furthermore, constituent elements in each of the embodiments may be voluntarily combined within the scope that does not depart from the gist of the present disclosure.

Furthermore, in each of the embodiments described above, the present disclosure is provided using the example in which hardware is used, but it is also possible that the present disclosure is realized in software in conjunction with the hardware.

Furthermore, the functional blocks that are used for each of the embodiments described above, are typically realized as an LSI that is integrated circuits each of which has an input terminal and an output terminal. The functional blocks may be individually provided as a single chip, or some or all of the functional blocks may be provided as integrated in a single chip. The LSI is referred to here, but in some cases, an IC, a system LSI, a super LSI, or an ultra LSI is also referred to, depending on the degree of integration.

In addition, a technique for circuit integration is not limited to the LSI and may be realized by a dedicated circuit or a general-purpose processor other than the LSI. After the LSI manufacturing, a Field Programmable Gate Array (FPGA) that is programmable, and a Reconfigurable Processor in which a setting for, or a connection to, a circuit cell within the LSI is reconfigurable may be used.

Moreover, if a circuit integration technology that brings about a substitute for the LSI appears as a result of advances in a semiconductor technology or of other technologies that derive from the semiconductor technology, of course, the functional blocks may be integrated using such a technology. There can be a likelihood of application of a biotechnology or the like.

INDUSTRIAL APPLICABILITY

The present disclosure is useful for the wireless communication system that has the C-RAN configuration.

REFERENCE MARKS IN THE DRAWINGS

1, 2 CELL
10, 20, 100, 200 BBU
11 to 15, 21 to 25, 40 RRH
31 to 33 TERMINAL 101, 201 CORE NETWORK INTERFACE
102, 202, 401 OPTICAL INTERFACE
103, 203, 405 UPLINK CONTROL UNIT
104, 204 BASEBAND SIGNAL PROCESSING UNIT
105, 107, 205, 207, 402, 406, 408 DOWNLINK CONTROL UNIT
106, 108, 206, 208, 407 PRIORITY DETERMINATION UNIT
403 RADIO FREQUENCY SIGNAL PROCESSING UNIT
404 ANTENNA

The invention claimed is:

1. A wireless communication system comprising:
a plurality of baseband processing apparatuses, each of which, in operation, performs baseband signal processing and outputs a baseband signal; and
a wireless apparatus, which, in operation, makes connections to the plurality of baseband processing apparatuses and transmits a radio frequency signal that is obtained by performing radio frequency signal processing on the baseband signal that is output from one of the plurality of baseband processing apparatuses,
wherein the wireless apparatus performs the radio frequency signal processing on the baseband signal that is output from a baseband processing apparatus that has established a link earlier, of the plurality of baseband processing apparatuses.

2. The wireless communication system of claim 1,
wherein the wireless apparatus is positioned at an edge of one cell that is formed by one of the plurality of baseband processing apparatuses.

3. The wireless communication system of claim 1,
wherein a priority is prescribed in advance for each of the plurality of baseband processing apparatuses for every given time interval, and
wherein a baseband processing apparatus for which highest priority is prescribed, of the plurality of baseband processing apparatuses, outputs the baseband signal to the wireless apparatus.

4. The wireless communication system of claim 3,
wherein, in a case where the baseband processing apparatus for which the highest priority is prescribed does not output the baseband signal, a baseband processing apparatus for which next highest priority is prescribed outputs the baseband signal.

5. The wireless communication system of claim 1,
wherein the plurality of baseband processing apparatuses acquires pieces of information relating to loads on each other, and
wherein a baseband processing apparatus that has a heaviest load, of the plurality of baseband processing apparatuses, outputs the baseband signal.

6. The wireless communication system of claim 5,
wherein, in a case where the baseband processing apparatus that has the heaviest load does not output the baseband signal, a baseband processing apparatus that has a next heaviest load outputs the baseband signal.

7. A wireless communication system comprising:
a plurality of baseband processing apparatuses, each of which, in operation, performs baseband signal processing and outputs a baseband signal; and
a wireless apparatus, which, in operation, makes connections to the plurality of baseband processing apparatuses and transmits a radio frequency signal that is obtained by performing radio frequency signal processing on the baseband signal that is output from one of the plurality of baseband processing apparatuses,
wherein a priority is prescribed in advance for each of the plurality of baseband processing apparatuses for every given time interval, and
wherein a baseband processing apparatus for which highest priority is prescribed, of the plurality of baseband processing apparatuses, outputs the baseband signal to the wireless apparatus.

8. The wireless communication system of claim 7,
wherein the wireless apparatus is positioned at an edge of one cell that is formed by one of the plurality of baseband processing apparatuses.

9. The wireless communication system of claim 7,
wherein, in a case where the baseband processing apparatus for which the highest priority is prescribed does not output the baseband signal, a baseband processing apparatus for which next highest priority is prescribed outputs the baseband signal.

10. The wireless communication system of claim 7,
wherein the plurality of baseband processing apparatuses acquires pieces of information relating to loads on each other.

11. A wireless communication system comprising:
a plurality of baseband processing apparatuses, each of which, in operation, performs baseband signal processing and outputs a baseband signal; and
a wireless apparatus, which, in operation, makes connections to the plurality of baseband processing apparatuses and transmits a radio frequency signal that is obtained by performing radio frequency signal processing on the baseband signal that is output from one of the plurality of baseband processing apparatuses,
wherein the plurality of baseband processing apparatuses acquires pieces of information relating to loads on each other, and
wherein a baseband processing apparatus that has a heaviest load, of the plurality of baseband processing apparatuses, outputs the baseband signal.

12. The wireless communication system of claim 11,
wherein the wireless apparatus is positioned at an edge of one cell that is formed by one of the plurality of baseband processing apparatuses.

13. The wireless communication system of claim 11,
wherein, in a case where the baseband processing apparatus that has the heaviest load does not output the baseband signal, a baseband processing apparatus that has a next heaviest load outputs the baseband signal.

* * * * *